July 2, 1968 W. M. HONIG 3,391,254

MAGNETIC HEAD WITH MEANS FOR PRODUCING A SHIFTABLE HIGH PERMEABILITY REGION IN A MAGNETIC PERMEABLE MATERIAL

Filed Oct. 15, 1964

INVENTOR.
WILLIAM M. HONIG

BY Darby & Darby

ATTORNEYS

United States Patent Office 3,391,254
Patented July 2, 1968

3,391,254
MAGNETIC HEAD WITH MEANS FOR PRODUCING A SHIFTABLE HIGH PERMEABILITY REGION IN A MAGNETIC PERMEABLE MATERIAL

William M. Honig, 6801 Bay Parkway,
Brooklyn, N.Y. 11204

Filed Oct. 15, 1964, Ser. No. 404,062
21 Claims. (Cl. 179—100.2)

ABSTRACT OF THE DISCLOSURE

A transducer for recording on magnetic tape comprises a core having a progressively diverging gap in which a thin film of magnetic permeable material is positioned. Because of the shape of the gap, it is possible to create a shiftable high permeability boundary zone which can be moved transversely with respect to a moving tape so that video data may be recorded in transverse tracks defined by the shifting high-permeability zone. The data recording means comprises one or two conductors extending generally transverse of the thin film and in proximity to the film and tape whereby data is recorded at the intersection of the circumferential magnetic field of the wire and the high-permeability zone.

This invention relates to magnetic transducers. More specifically, the present invention relates to a transducer particularly useful in recording and/or reproducing wide band signals such as video frequency television or digital information signals.

It is conventional to record wide band signals, such as television signals, on magnetic tape along tracks running substantially transverse to the longitudinal direction in which the tape is moved. Originally, tape recording systems for this purpose required complex mechanical arrangements including a plurality of transducers which rotated across the tape to record and reproduce the information.

To eliminate the complications and defects inherent in a rotating transducer system, all electrical scanning systems have been proposed (see, for example, U.S. Patent No. 3,084,227 of Peters), wherein a plurality of electromagnetic coils cooperate to move a high permeability magnetic zone transversely across the storage tape. In such previous systems the signal to be recorded is coupled to a complicated signal probe, which then records the signal along the path defined by the shifting high permeability zone.

The present invention relates to an improved transducer of the scanned permeability type and has for a main objective the provision of an improved electrically scanning magnetic transducer.

Another object of the invention is to provide a magnetic transducer for use in recording or reproducing signals along transverse tracks on a tape, wherein the scanning is accomplished by simplified all electrical means.

Still another object of the invention is to provide a simplified signal probe for use in recording or reproducing signals along transverse tracks of a magnetic tape.

Another object of the invention is to provide an all electrical transducer assembly for recording or reproducing wide band signals on magnetic tapes, wherein the number of electrical leads is reduced.

Still another object of the invention is to provide simplified video translation circuitry for use in magnetically recording or reproducing video signals.

The manner in which the above objects of the invention are accomplished is explained below with reference to the following drawings, wherein.

Figures 1, 2A, 2B, 2C, 3, 4, 5, 6, 7:
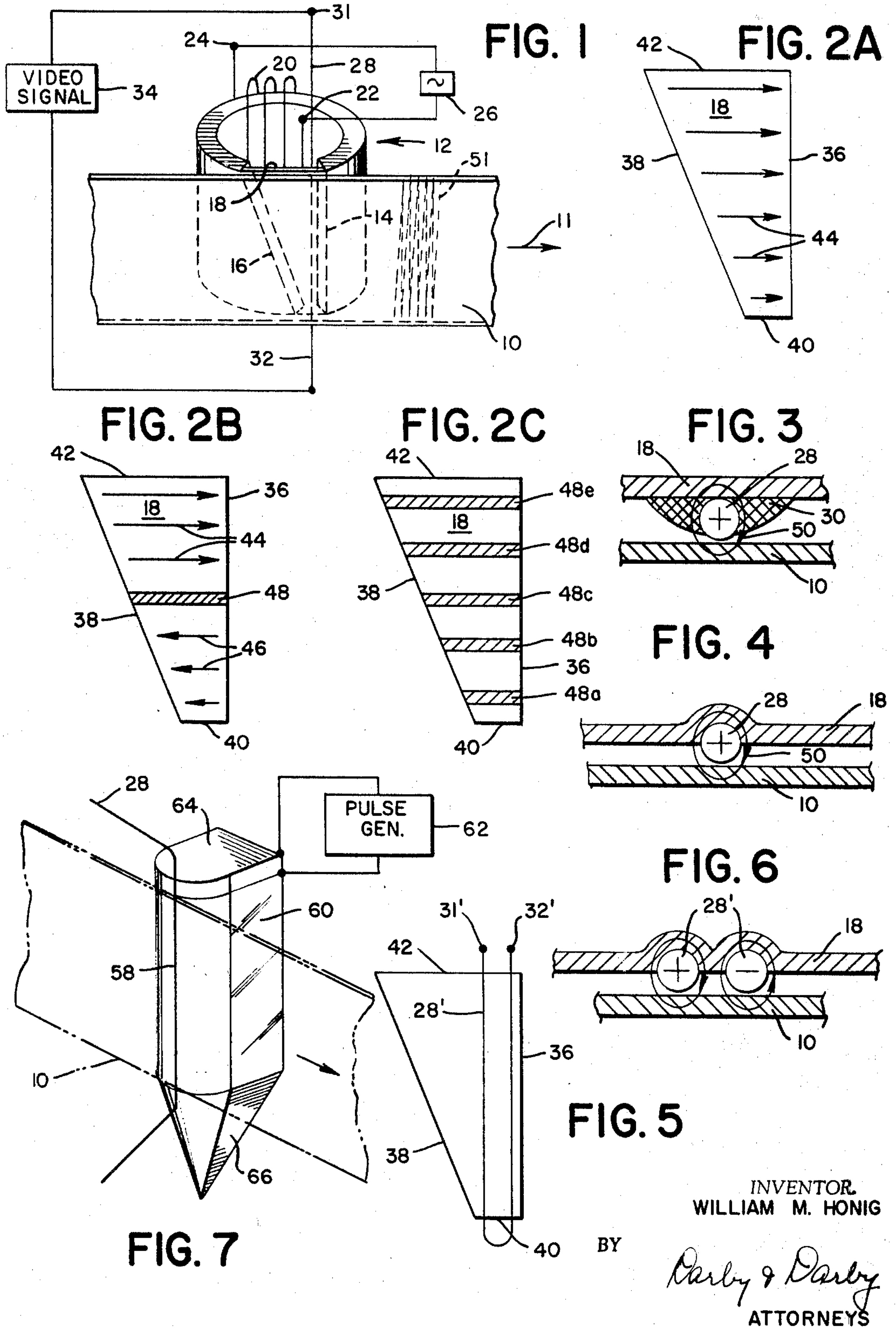
FIGURE 1 is a perspective, partially schematic view of a magnetic transducer according to the invention.
FIGURES 2A, 2B and 2C are schematic illustrations used to explain the manner in which a high permeability zone is created in a magnetic thin film and thereafter shifted across the film.
FIGURE 3 is a cross-sectional view of a signal probe in accordance with the invention.
FIGURE 4 is a cross-sectional view of another embodiment of a signal probe in accordance with the invention.
FIGURE 5 is a plan view illustrating still another embodiment of a signal probe in accordance with the invention.
FIGURE 6 is a fragmentary sectional view of the signal probe of FIGURE 5 taken along the line 6—6 in FIGURE 5.
FIGURE 7 is a perspective view of another embodiment of a magnetic transducer according to the invention.

Referring to FIGURE 1, a conventional magnetic tape is indicated generally at 10. Tape 10 may comprise, for example, an iron oxide coating on a Mylar backing and is movable by conventional tape drive means (not shown) in the direction of arrow 11.

The magnetic transducer according to the invention includes a generally cylindrical head 12, the width of which is equal to the width of tape 10. Transducer head 12 is a hollow ferrite cylinder similar in appearance to a form of conventional audio recording head. The gap of the head, which extends across the entire tape 10, is defined by opposing divergent edges 14 and 16. As illustrated, edges 14 and 16 are shaped with respect to each other so that the dimension of the gap tangential to the tape (in the direction of movement of the tape) progressively increases.

A thin film of magnetic material 18, having a substantially rectangular hysteresis loop, is mounted in the gap of the recording head 12 defined by edges 14 and 16. By way of example only, thin film 18 may be made of known nickel-iron alloys such as deltamax or permalloy. Thin film 18 may be mounted on a glass block or similar dielectric block within head 12, although for purposes of simplicity and clarity a separate supporting block has not been shown. A coil 20 is wound arround ferrite core 12 and includes terminals 22 and 24 which are connected across a source of alternating electric potential 26. In the illustrated embodiment, the signal probe includes a single wire 28 which is secured to the under surface of film 18 by adhesive means such as a lacquer or epoxy or any other non-conducting, non-magnetic material, as illustrated at 30 in FIGURE 3. Wire probe 28 includes terminals 31 and 32 which are connected across the source of video signals to be recorded, indicated schematically at 34.

The basic recording principle of the present invention is similar to a technique known as "boundary-displacement-magnetic recording." This technique generally refers to a system in which portions of the tape are saturated magnetically in opposite directions, whereby the boundary zone between the two oppositely saturated areas remains substantially magnetically neutral or, in other words, highly permeable with respect to the adjacent saturated areas. In the present case, a high permeability zone is created in the magnetic film adjacent the tape, and shifted transversely with respect to the tape to enable recording (or reproducing) on tracks across the tape.

The manner in which this thin, high permeability zone is created in accordance with the invention is best explained with reference to FIGURES 2A, 2B and 2C, which are plan views of magnetic film 18. The film 18 includes a side 36 which is contiguous with ferrite core edge 14, and a slanted side 38 which is contiguous with core edge 16. The two sides 36 and 38 may be straight and terminate in thin film edges 40 and 42 as illustrated.

When a current of a first polarity is fed by source 26 through coil 20, a magnetic field is created across the gap of core 12 and, if the current is great enough, thin film 18 will be completely saturated with a magnetic flux in a direction arbitrarily indicated by arrows 44. If, after the film 18 is saturated in this direction, a current of opposite polarity is applied to coil 20, the magnetic field across the gap of head 12 will tend to saturate the film 18 in the opposite direction. However, because of the progressively increasing width of film 18, this opposite field, depending upon its strength, will saturate magnetic film 18 in a portion near edge 40 as illustrated by arrows 46.

When the above occurs, there are two adjacent and opposite saturated magnetic fields in film 18 indicated by arrows 44 and 46, respectively. However, in the region between fields 44 and 46, the adjacent fields cancel each other, creating a high permeability boundary zone 48. Hence, the permeability of magnetic film 18 in every area except zone 48 approaches that of air. By properly varying the alternating current applied by source 26 to coil 20, zone 48 may be progressively moved from edge 40 to edge 42 as schematically illustrated in FIGURE 2C by the zones **48*a* to 48*e*. Of course, in the usual case, zone 48 is moved progressively to effect a smooth scanning of the tape 10**.

FIGURE 3 schematically illustrates the manner in which video signals from source 34 are recorded along the path defined by the scanning zone 48. In FIGURE 3, the current in wire probe 28 is shown going into the plane of the paper. As a result, a magnetic field indicated by arrow 50 is produced around the entire wire. It is only in the area immediately beneath the high permeability zone 48 that the magnetic flux will be sufficient to record a signal on tape 10. In all other areas beneath thin film 18, the saturated film will not behave as a ferro-magnetic medium, and the total magnetic field in those areas will be insufficient to record significantly on tape 10. Thus, the cooperation of the shifting zone 48 and the field on wire 28 causes the signals to be recorded at successive instants of time along tracks such as those schematically illustrated at 51, which tracks are substantially transverse to the direction of movement of the tape 10.

FIGURE 4 shows another embodiment of the signal probe structure in which the wire 28 is embedded in thin film 18. Since this effectively increases the length of zone 48 through which the flux 50 passes, the efficiency of the translation circuitry will be increased. With the technique of FIGURE 4 or extensions thereof, the magnetic material 18 can virtually surround the conductor 28 except for the portion of the peripheral flux path completed by the magnetic material of tape 10. If desired, in this case also, a lacquer or epoxy, such as indicated at 30 in FIGURE 3, may be used to secure probe 28 to film 18.

In another embodiment of the probe circuitry, illustrated in FIGURE 5, the signal probe comprises a wire loop 28' connected to terminals 31' and 32', corresponding to the similarly numbered elements of FIGURE 1. Loop 28' is also secured to the surface of film 18 facing tape 10 and may be embedded therein as illustrated in FIGURE 6. The operation of this embodiment is essentially the same as that described above; however, the use of a loop instead of a single wire intensifies the magnetic field in the region between the wires of the loop probe to increase the efficiency.

By way of example only, tape 10 may be approximately two inches wide. The magnetic thin film 18 may have a thickness of from .001 to .00050 inch. The thickness of zone 48 is determined by the slope of thin film edge 38, the magnitude of the current in the coil 20, and the basic geometry of the head 12. It may be from 10 to 1000 microinches in a typical case. The diameter of the probe wire 28 may be .001 to .0001 inch. The invention is of particular use in the recording of television signals, although it is not so limited and would have utility in various recording systems, particularly those used for recording wide band signals such as required for digital information recording purposes.

While a continuous cyclical scan of the tape has been described, it is apparent that the scan control signal may be varied to controllably select the portion of the transverse dimension of the tape to be recorded or read, thereby providing a capability of recording on or reading from a desired longitudinal track on a multi-track tape, all in response to a rapidly variable electrical signal.

Another embodiment of the invention for displacing the high permeability zone of the magnetic thin film is illustrated in FIGURE 7. In this embodiment, a rectangular thin film of magnetic material 58 having a rectangular hysteresis loop is mounted on a glass block 60, or other suitable support structure. Film 58 passes transversely across tape 10, and, as illustrated, is stressed by bending it around the rounded portion of block 60.

A permanent stress in the film will cause it to have a low permability; however, if a sonic pulse or short pressure wave is launched across the magnetic film, so that its pressure is opposite the stress of the magnetic material, a region of low stress effectively moves across this material. In this low stress region the permeability is sufficiently high so that recording may take place with the type of signal probe 28 illustrated in FIG. 1.

For the above purpose, a pulse generator 62 is coupled to a transducer 64, which may be either a piezoelectric crystal or a magnetostrictive transducer, mounted at one end of block 60. When transducer 64 is pulsed by generator 62, the low stress region is shifted transversely across tape 10 in a manner analogous to the shifting of the high permeability zone 48 in FIGURES 1 to 6. An acoustic absorber 66, for example rubber or lead, absorbs the waves propagated by transducer 64 to prevent undesirable reflections. If necessary, thin film 58 may be magnetically biased in order to increase the magnitude of the permeability change. Any suitable probe arrangement as in FIGURES 3, 4 or 5 may be provided to produce or detect the magnetic flux for recording or reproducing the video signals.

The scanning apparatus of FIGURE 7 will yield a scanning rate equal to the velocity of propagation of the sonic pulse in thin film 58. This scanning speed will be constant and the circuit for generating such a pulse is relatively simple. The sonic pulse duration is proportional to the vertical resolution for recording, i.e., in the one-half to ten microsecond region.

Although preferred embodiments of the invention have been illustrated and described, the invention is not so limited and many modifications thereof will be obvious to those skilled in the art. Accordingly, the invention is not to be construed as limited to the specific embodiments shown or suggested but should be defined by reference to the following claims.

What is claimed is:

1. In a transducer for use with a magnetizable tape wherein a magnetic permeable material is adapted to be positioned adjacent a portion of the tape on which it is desired to record or read data signals, and wherein a high-permeability boundary zone is created in said material and shifted across said tape in a preselected direction, the improvement comprising a single conductor adapted to extend across said tape in said preselected direction for recording or reading said data signals, said conductor being disposed between said magnetic permeable material and tape with its circumferential magnetic field caused by a current therethrough intersecting said magnetic permeable material and adapted to intersect said tape, and with the longitudinal axis of said field extending in said preselected direction whereby data may be recorded on or read from said tape at a position on the tape which is nearest the intersection of said high-permeability zone and a circumferential magnetic field around said conductor.

2. A transducer according to claim 1, including means for securing said conductor in a contiguous relationship to said magnetic permeable material.

3. A transducer according to claim 2, wherein said securing means comprises a dielectric adhesive.

4. A transducer according to claim 1, wherein said conductor is at least partially imbedded in said material to thereby decrease the air gap encountered by said circumferential magnetic field.

5. A transducer according to claim 1, including a second conductor adjacent said single conductor, with the circumferential magnetic fields around said conductors substantially reinforcing each other in the area between said conductors.

6. A transducer according to claim 5, wherein said two conductors comprise a loop.

7. A transducer for use in recording or reading data signals with respect to a movable magnetizable tape, comprising a core having a gap adapted to extend across the portion of said tape on which a data track is to be recorded or read, a magnetic permeable material positioned in proximity to said gap and adapted to be saturated by a magnetic field across said gap, means for creating a saturating magnetic field in said material, the magnitude of said saturating field increasing progressively as measured in a direction generally transverse to said data track, coil means wound around said core for creating a magnetic field in said material varying in magnitude along said transverse direction and opposing said saturating magnetic field to thereby create a shiftable high-permeability boundary zone where the sum of said saturating and varying magnetic fields is zero, and means for recording or reading signals with respect to said tape in an area adjacent said high-permeability zone.

8. A transducer according to claim 7, wherein the width of said gap diverges progressively as measured in said transverse direction, and said means for creating a saturating magnetic field includes means for applying a voltage of one polarity to said coil means.

9. A transducer according to claim 8, wherein said magnetic permeable material comprises a film positioned across said gap.

10. A transducer according ot claim 7, wherein said magnetic permeable material comprises a film positioned across said gap.

11. A transducer according to claim 10, wherein said means for creating a varying magnetic field comprises means for applying a voltage of a polarity opposite said one polarity to said coil means.

12. A transducer according to claim 11, wherein said film is shaped similarly to said gap.

13. A transducer according to claim 12, wherein said conductor is at least partially imbedded in said magnetic permeable material.

14. A transducer according to claim 13, wherein said magnetic permeable material is in the form of a film.

15. A transducer according to claim 7, wherein said recording means comprises at least one conductor extending generally in the direction of said data track and adapted to be connected to a source of data signals, said conductor being positioned in proximity to said magnetic permeable material such that information can be recorded on said tape where said high-permeability zone intersects the circumferential magnetic field around said conductor caused by said data signals.

16. A transducer according to claim 15, including means for securing said conductor to said magnetic permeable material.

17. A transducer according to claim 7, including two conductors extending across said area in a substantially parallel relationship and having the circumferential magnetic fields created thereby reinforcing each other in the area between such conductors.

18. A magnetic transducer for use with an elongated movable magnetizable tape, comprising a film of magnetic permeable material positioned adjacent a portion of the tape on which it is desired to record data signals, said film being bent and having the resultant internal stress forces in said material extending generally in the direction of the longitudinal axis of the tape thereby creating a low-permeability stressed zone in the film extending generally transversely of said axis, acoustic means for propagating an acoustical wave through said low-permeability zone to thereby move a high-permeability region across said film, and means for recording signals on said tape in an area adjacent said high-permeability region.

19. A magnetic transducer according to claim 18, wherein said means for recording comprises at least one conductor extending across said tape in a direction generally parallel to said low-permeability zone.

20. A transducer according to claim 19, wherein said acoustic means comprises an electro-acoustical transducer physically attached to said thin film adjacent one longitudinal edge of said tape and means adjacent the other longitudinal edge of said tape for absorbing the acoustical waves generated by said electro-acoustical transducer.

21. In a transducer for use in recording signals on magnetic tape or for reproducing signals recorded on such tape, wherein said tape is transported along its length, the improvement, comprising, in combination,

- an element of high permeability magnetic material extending across the path of said tape,
- means for creating a limited zone of high permeability in said material and for sweeping said zone across the width of said tape, and
- a single conductor extending across said tape and passing across said zone for recording signals on or picking up signals from said tape as said tape is transported past said conductor.

References Cited

UNITED STATES PATENTS

| | | | |
|---|---|---|---|
| 2,984,825 | 5/1961 | Fuller et al. | 340—174 |
| 3,053,941 | 9/1962 | Johnson | 340—174 |
| 3,084,227 | 4/1963 | Peers | 179—100.2 |
| 3,140,471 | 7/1964 | Fuller | 340—174 |
| 3,188,399 | 7/1965 | Eldridge | 340—174.1 |
| 3,271,571 | 9/1966 | Proebster | 340—174.1 |
| 2,862,066 | 11/1958 | Thiele | 179—100.2 |
| 2,975,241 | 3/1961 | Camras | 179—100.2 |

BERNARD KONICK, *Primary Examiner.*

V. P. CANNEY, *Assistant Examiner.*